(12) United States Patent
Okuhara et al.

(10) Patent No.: US 8,546,695 B2
(45) Date of Patent: *Oct. 1, 2013

(54) GROMMET

(75) Inventors: Takashi Okuhara, Yokkaichi (JP);
Tsutomu Sakata, Yokkaichi (JP);
Satoshi Ujita, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 377 days.

This patent is subject to a terminal disclaimer.

(21) Appl. No.: 12/994,060

(22) PCT Filed: Dec. 18, 2008

(86) PCT No.: PCT/JP2008/073055
§ 371 (c)(1),
(2), (4) Date: Nov. 22, 2010

(87) PCT Pub. No.: WO2009/147762
PCT Pub. Date: Dec. 10, 2009

(65) Prior Publication Data
US 2011/0073351 A1   Mar. 31, 2011

(30) Foreign Application Priority Data
Jun. 3, 2008 (JP) ................................. 2008-146296

(51) Int. Cl.
*H01B 17/26* (2006.01)
*H01B 17/58* (2006.01)
*H02G 3/22* (2006.01)
*F16L 5/00* (2006.01)

(52) U.S. Cl.
USPC ...................... 174/152 G; 174/153 G; 16/2.1

(58) Field of Classification Search
USPC .................. 174/152 A, 152 G, 152 R, 153 G,
174/154, 651, 657, 660; 16/2.1, 2.2, 2.5;
277/602, 608, 636; 248/56
See application file for complete search history.

(56) References Cited

U.S. PATENT DOCUMENTS 5,774,934 A * 7/1998 Fujita et al. ............... 174/153 G
6,442,794 B2 * 9/2002 Uchida et al. ............. 174/153 G
(Continued)

FOREIGN PATENT DOCUMENTS

JP   2001-263494   9/2001
JP   2001-333521   11/2001
(Continued)

OTHER PUBLICATIONS

U.S. Appl. No. 12/898,113 to Tetsuya Fujita, filed Oct. 5, 2010.
(Continued)

*Primary Examiner* — Chau Nguyen
*Assistant Examiner* — Roshn Varghese
(74) *Attorney, Agent, or Firm* — Greenblum & Bernstein P.L.C.

(57) ABSTRACT

A grommet includes an inner tube and an outer tube coupled to the inner tube by an annular coupling section. A slant wall section of the outer tube has a curved portion at a position having an outer diameter equal to an inner diameter of a through-hole in a vehicle body panel. The curved portion has a different inclination angle from the slant wall section. An inclination angle of the slant wall section at a larger diameter side with respect to the curved portion is set to be smaller than an inclination angle at a smaller diameter side with respect to the curved portion. The slant wall section is provided on an inner peripheral surface at the smaller diameter side with a bending stress absorbing portion of which an inner surface is recessed annularly to be a smaller thickness.

2 Claims, 10 Drawing Sheets

(56) References Cited

U.S. PATENT DOCUMENTS

| | | | |
|---|---|---|---|
| 6,541,703 B2 | 4/2003 | Nakata et al. | |
| 2001/0045298 A1 | 11/2001 | Nakata | |
| 2002/0036097 A1 | 3/2002 | Okuhara et al. | |
| 2002/0036098 A1 | 3/2002 | Okuhara et al. | |
| 2004/0154819 A1* | 8/2004 | Sakata | 174/65 G |

FOREIGN PATENT DOCUMENTS

| | | |
|---|---|---|
| JP | 2002-171644 | 6/2002 |
| JP | 2003-134646 | 5/2003 |
| JP | 2007-276558 | 10/2007 |

OTHER PUBLICATIONS

U.S. Appl. No. 12/992,926 to Takashi Okuhara et al., filed Nov. 16, 2010.

U.S. Appl. No. 12/994,042 to Takashi Okuhara et al., filed Nov. 22, 2010.

U.S. Appl. No. 12/995,876 to Takashi Okuhara et al., filed Dec. 2, 2010.

U.S. Appl. No. 12/992,738 to Takashi Okuhara et al., filed Nov. 15, 2010.

* cited by examiner

Fig.9
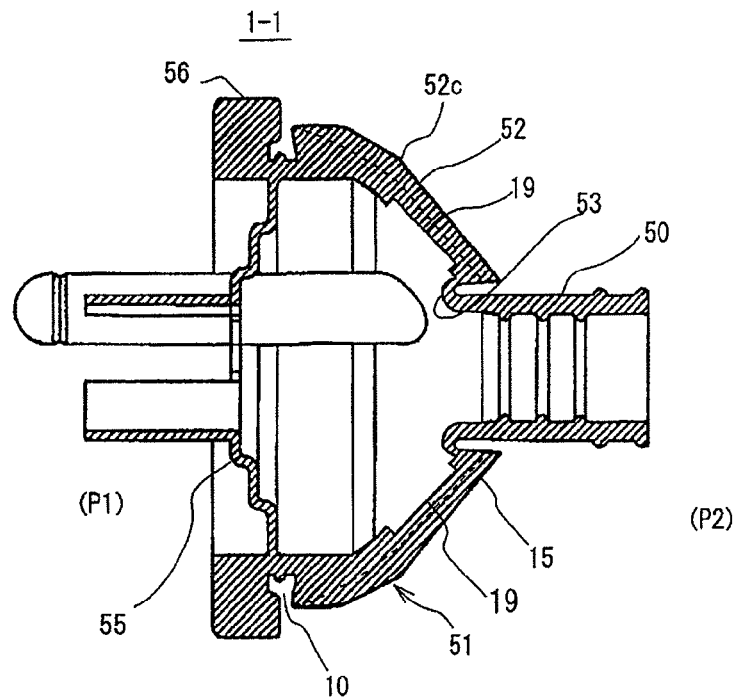
Fig.10A (Prior Art)
Fig.10B (Prior Art)
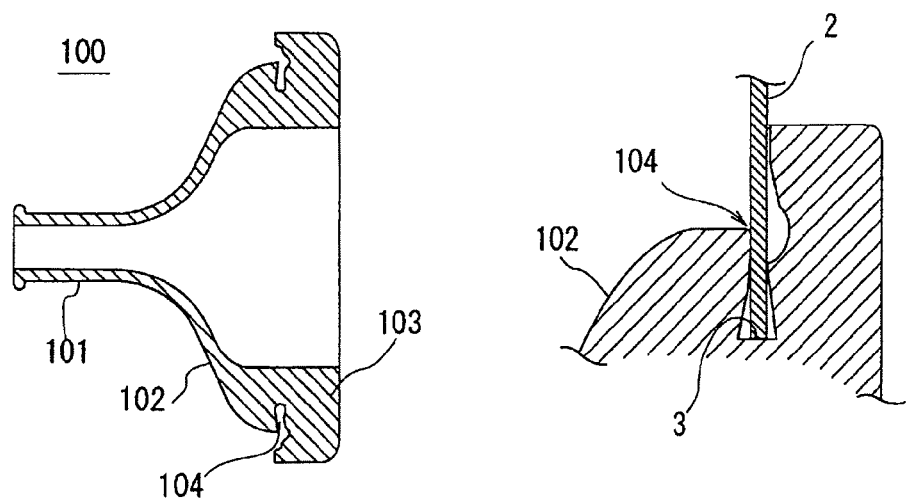

GROMMET

FIELD OF THE INVENTION

This invention relates to a grommet and more particularly relates to a grommet that is mounted on a wire harness to be wired in a motor vehicle and is attached to a through-hole in a vehicle body panel to protect, waterproof, and dustproof a portion of the wire harness inserted in the through-hole.

BACKGROUND OF THE INVENTION

Heretofore, a wire harness to be wired from an engine room in a motor vehicle to a passenger room mounts a grommet, and the grommet is attached to a through-hole provided in a vehicle body panel for partitioning a vehicle body of the motor vehicle into the engine room and the passenger room so as to protect the wire harness passing the through-hole and to waterproof, dustproof, and sound-insulate the through-hole from an engine room side to a passenger room side.

Such grommet has been disclosed in JP 2001-263494 A (Patent Document 1). In many cases, such grommet has a construction shown in FIG. 10A. A grommet 100 includes a smaller diameter tubular section 101 and a conical enlarging diameter tubular section 102 contiguous with the section 101. The enlarging diameter section 102 is provided on a larger diameter end with a larger thickness portion 103. The larger thickness portion 103 is provided in an outer peripheral surface with an annular vehicle body latch recess 104. As shown in FIG. 10B, the grommet 100, through which a wire harness passes, is inserted into a through-hole 3 in a vehicle body panel 2, and the vehicle body latch recess 104 is engaged with a peripheral edge around the through-hole 3.

Currently, a wiring space for the wire harness has been decreased in association with a drastic increase of electrical equipments to be installed in a motor vehicle. Consequently, as shown in FIG. 11A, the wire harness W/H that passes the through-hole 3 in the vehicle body panel 2 will interfere with an electrical equipment D, if the wire harness W/H is arranged straightly. In particular, since electrical equipments to be installed in an instrument panel, into which the wire harness is drawn, has been increased significantly, there will be a possibility that the wire harness W/H is bent at an angle of 90 (ninety) degrees, as shown in FIG. 11A.

If the wire harness W/H is bent at the angle of 90 degrees, as shown in FIG. 11A, the smaller diameter tubular section 101 of the grommet 100 closely mounted on the wire harness W/H is also bent. The enlarging diameter tubular section 102 contiguous with the smaller diameter tubular section 101 is pulled in a bending direction, and the vehicle body latch recess 104 provided on the enlarging diameter tubular section 102 is also pulled. Consequently, as shown in FIG. 11B, a slant wall side surface 104a of the recess 104 is deformed to float up. Thus, there is a possibility that any deleterious effect will occur in a sealing function between the inner peripheral surface of the through-hole 3 and the recess 104.

Patent Document 1: JP 2001-263494 A

SUMMARY OF THE INVENTION

Problems that the Invention is to Solve

In view of the above problems, an object of the present invention is to provide a grommet that does not lower a sealing function even if a wire harness is bent in arrangement after the wire harness passes a through-hole in a vehicle body panel.

Means for Solving the Problems

In order to achieve the above object, the present invention is directed to a grommet that is mounted on a wire harness to be inserted into a through-hole in a vehicle body, is engaged with the vehicle body, and is made of an elastic material. The grommet includes: an inner tube through which electrical cables in the wire harness pass in a close contact manner; and an outer tube coupled through an annular coupling section to the inner tube and provided with a slant wall section. The slant wall section of the outer tube is provided with a curved portion at a position having an outer diameter equal to an inner diameter of the through-hole. The curved portion has a different inclination angle from the slant wall section. An inclination angle of the slant wall section at a larger diameter side with respect to the curved portion is set to be smaller than an inclination angle at a smaller diameter side with respect to the curved portion. A larger thickness portion is contiguous with a larger diameter end of the slant wall in parallel to an axial direction. A vehicle body latch recess is provided in an outer peripheral surface of the slant wall section between the larger diameter end of the slant wall and the larger thickness portion in an annular manner. The slant section is provided with a plurality of stepped projecting ribs that extend from a smaller diameter end of the slant wall section to the larger diameter end and are spaced apart from one another in a peripheral direction. The slant wall section is provided on an inner peripheral surface at the smaller diameter side with a bending stress absorbing portion of which an inner surface is recessed annularly to be a smaller thickness.

In the grommet of the present invention, when the wire harness is bent, the inner tube that closely contacts with electrical cables in the wire harness is also bent. However, the bending stress absorbing portion having a smaller thickness is disposed at the smaller diameter side of the slant wall section at the bent inner tube side. Consequently, the bending stress absorbing portion is partially bent to absorb a bending force transmitted from the bent inner tube, thereby cutting off transmission of the bending from the bending stress absorbing portion to the larger diameter side of the slant wall section. Accordingly, the bending of the wire harness is not transmitted to the vehicle body latch recess provided in the larger thickness portion of the slant wall section at the larger diameter side, thereby obtaining a good sealing function. The bending stress absorbing portion is recessed in the inner surface of the slant wall section and the absorbing portion is provided on the outer surface with the stepped projecting ribs that extend radially and in particular are arranged closely at the smaller diameter side. Thus, even if any interfering member contacts with the outer surface of the slant wall section, it is possible to prevent the bending stress absorbing portion from directly contacting with the interfering member, and to prevent any cracks or breakages from occuring in the bending stress absorbing portion, thereby enhancing durability of the grommet. In addition, the stepped projecting ribs can reduce a contact area between the slant wall and the inner peripheral surface of the through-hole in the vehicle body panel. Since the inclination angle of the slant wall section is changed at the curved portion, it is possible to lower the inserting force of the grommet into the through-hole.

It is preferable to provide 4 to 8 (four to eight) projecting ribs in the peripheral direction and most preferable to provide 6 (six) projecting ribs.

Preferably, a thickness of the bending stress absorbing portion is set to be 50 to 80% (fifty to eighty percent) of the slant wall section of which a portion is not provided with the projecting ribs, and is set to be 70 to 90% (seventy to ninety percent) of the slant wall section of which a portion is provided with the projecting ribs.

The bending stress absorbing portion that is recessed by the above percent can effectively absorb the bending stress and can keep desired strength.

Since strength of the grommet will be lowered if a width of the bending stress absorbing portion is too broad, it will be better that the width is less than 10 mm (ten millimeters).

Preferably, the annular coupling section may protrude from an outer peripheral surface of the inner tube at an intermediate part between both ends of the inner tube at a pushing-in side and a drawing-out side in a longitudinal direction. The larger thickness portion of the outer tube is contiguous with an outer end of the annular coupling section. An inner peripheral surface at the smaller diameter end side of the slant wall section is spaced apart through a given clearance from the outer peripheral surface of the inner tube. An end of the inner tube at the drawing-out side protrudes outward from the slant wall section.

The slant wall section may be provided on the smaller diameter end with a drawing-out distal end side tubular portion that extends in parallel to the axis of the inner tube and a separated clearance may be defined between the inner peripheral surface of the drawing-out distal end side tubular portion and the outer peripheral surface of the inner tube.

In the above grommet, the inner tube that passes the wire harness in a close contact manner is separated through a great space apart from the outer tube provided with the vehicle body latch recess at the drawing-out side of the wire harness.

Even if the wire harness drawn out from the separated type grommet and arranged in the passenger room is bent sharply by an angle of about 90 degrees to bend the inner tube, it is possible not to directly transmit the deformation of the inner tube to the outer tube. Since the inner tube is coupled through the annular coupling section to the outer tube at the intermediate part of the inner tube spaced from the drawing-out side of the inner tube by a given distance, the annular coupling section can absorb the deformation of the inner tube, so that the deformation of the inner tube does not affect the vehicle body latch recess provided in the larger diameter end side of the outer tube.

In the above separated type grommet, the annular coupling section projects slant from a coupling part with the inner tube toward the pushing-in side. A pushing rib protrudes from a slant portion of the annular coupling section toward an inner surface of the slant wall section of the outer tube. The bending stress absorbing portion is disposed at a side of the curved portion over a position on the slant wall section with which the pushing rib contacts.

When the grommet is inserted into the through-hole in the vehicle body panel, a working person holds and pushes the wire harness at the pushing-in side of the inner tube. Since the inner tube is coupled through the annular coupling section to the outer tube, the pushing force is hardly transmitted to the slant wall section at the drawing-out side of the outer tube. Thus, the pushing rib protrudes from the annular coupling section, and the pushing rib contacts with the inner peripheral surface of the slant wall section at the drawing-out side to transmit the pushing force to the slant wall section, thereby enhancing workability of inserting the grommet.

Since the annular coupling section has a smaller thickness and does not protrude directly in the radial direction but slants in the axial direction, when the inner tube is deformed on account of the bending of the wire harness, the annular coupling section can absorb the deformation, so that the deformation does not affect the outer tube. Thus, even if the wire harness is sharply bent in the engine room side, the annular coupling section can absorb the deformation of the wire harness, so that the vehicle body latch recess provided in the outer tube is not deformed.

Preferably, the annular coupling section is formed into a V-shaped configuration that slants from the inner tube to the pushing-in side and then to the drawing-out side. This V-shaped configuration can increase an amount of absorbing the deformation in the annular coupling section when the inner tube is bent on account of the bending of the wire harness.

It is preferable that the pushing rib is continuous in its peripheral direction. This enables the pushing force to the slant wall section go be uniform. It is preferable that a thickness of the pushing rib is set to be 2 to 4 (two to four) times of a thickness of the annular coupling section and to be larger than a thickness of the slant wall section.

If a portion, with which the pushing rib contacts, has a smaller thickness in order to provide the bending stress absorbing portion, the portion will lower transmission of the pushing force from the pushing rib to the slant wall. Accordingly, as described above, the bending stress absorbing portion is provided on the larger diameter side adjacent the portion with which the pushing rib contacts, that is, on the curved portion side of the slant wall section.

The slant wall is provided with a stopper projection on the smaller diameter side with which the pushing rib contacts at the opposite side from the bending stress absorbing portion, thereby preventing the pushing rib from shifting.

Thus, the stopper projection can prevent a projecting end that contacts with the inner peripheral surface of the slant wall section from sliding along the slant wall section and coming out from the slant wall section.

It should be noted that the present invention is not limited to the separated type grommet. The present invention can be applied to a grommet wherein the smaller diameter end of the slant wall section is continued through the annular coupling section to the inner tube.

If the inner tube of a coupling type grommet is deformed in connection with the bending of the wire harness, the bending action will be directly applied to the smaller diameter side of the slant wall section. However, since the slant wall section is provided on the smaller diameter side with the bending stress absorbing portion, it is possible to cut off transmission of deformation from the slant wall section to the vehicle body latch recess provided in the larger thickness portion of the slant wall section. Accordingly, the coupling type grommet can keep a good sealing function.

Effects of the Invention

As described above, according to the present invention, in the case where the wire harness is bent sharply to deform the inner tube, the bending stress absorbing portion provided on the smaller diameter side of the slant wall section at the side of the bent inner tube can absorb the bending and can prevent the bending from transmitting to the vehicle body latch recess provided in the larger diameter side of the slant wall section.

BRIEF EXPLANATION OF THE DRAWINGS

FIG. 9 is a longitudinal section view of a second embodiment of a grommet in accordance with the present invention.

FIGS. 10A and 10B are longitudinal section views of a prior art grommet.

EXPLANATION OF SIGNS

Figure 1A:
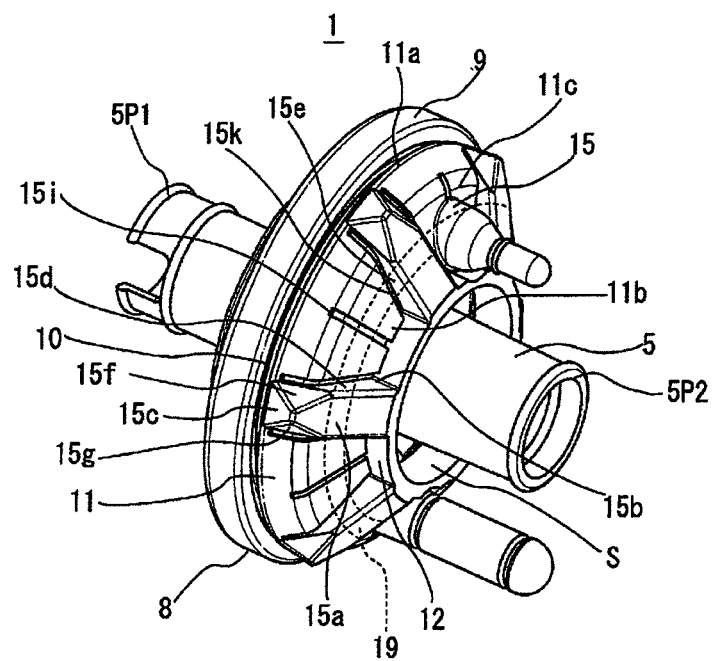
FIG. 1A is a perspective view of a grommet of the present invention taken from a drawing-out side.
Figure 1B:
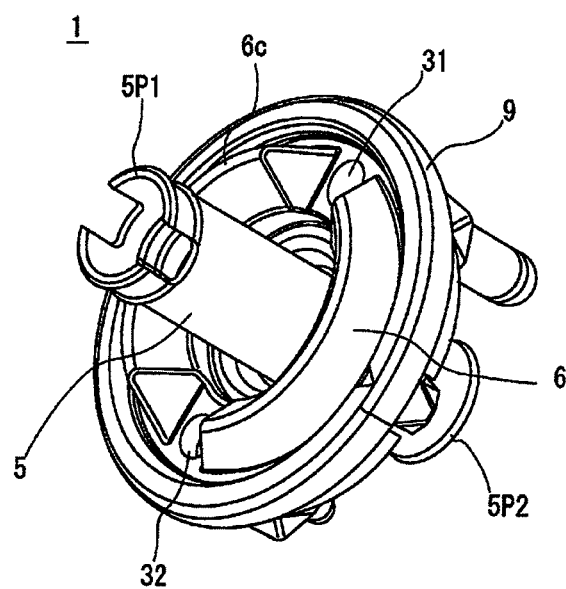
FIG. 1B is a perspective view of the grommet of the present invention taken from a pushing-in side.

1: grommet
2: vehicle body panel
3: through-hole
5: inner tube
6: annular coupling section
8: outer tube
9: larger thickness portion
10: vehicle body latch recess
11: slant wall section
12: drawing-out distal end side tubular section
 12a: stopper projection
15: projecting rib
18: pushing rib
19: bending stress absorbing portion

PREFERRED ASPECTS OF EMBODYING THE INVENTION

Referring now to the drawings, embodiments of a grommet in accordance with the present invention will be described below.

FIGS. 1A to 8 show a first embodiment of a grommet in accordance with the present invention.

Figure 7:
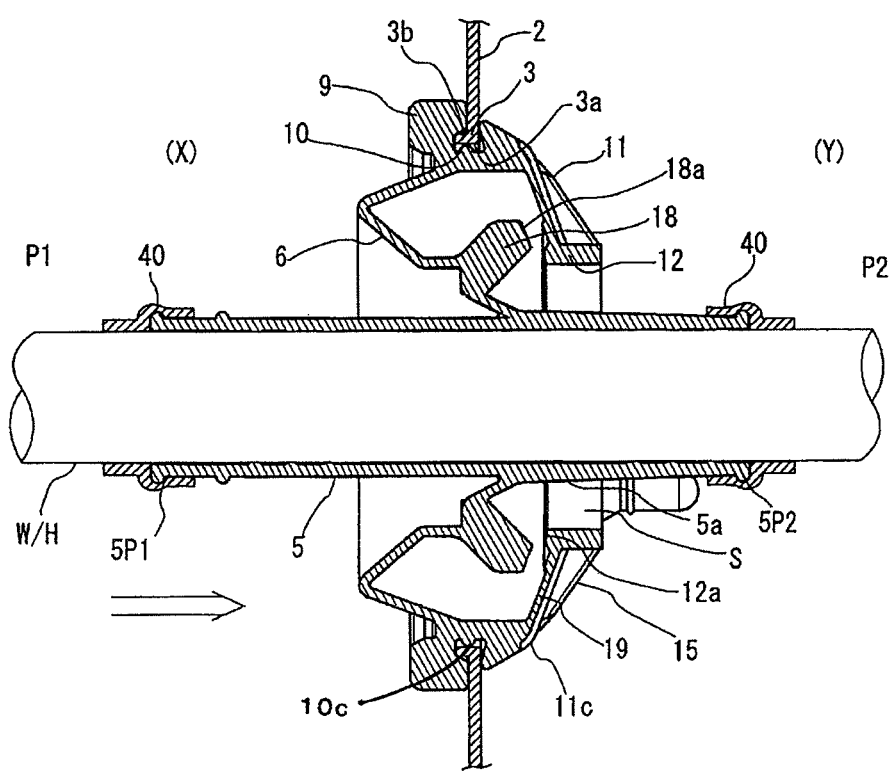
FIG. 7 is a longitudinal section view of the grommet into which a wire harness is inserted and that is attached to a vehicle body.

As shown in FIG. 7, a grommet 1 is mounted on a wire harness W/H arranged from an engine room X in a vehicle motor via a through-hole 3 in a vehicle body panel 2 to a passenger room Y. The grommet 1 is engaged with a peripheral edge around the through-hole 3 to be attached to the vehicle body. The grommet 1 is a one-motion type grommet that is inserted into the through-hole 3 from an engine room X so as to be attached to the vehicle body. The one end of the grommet 1 defines a pushing-in side P1 while the other end defines a drawing-out side P2. The grommet 1 is molded from rubber or elastomer.

The grommet 1 in the first embodiment is a separated type grommet in which a space is defined between a smaller diameter end side of a slant wall section and an inner tube.

The grommet 1 includes an inner tube 5 having a smaller diameter and permitting a set of electrical cables in the wire harness W/H to pass, an annular coupling section 6 that protrudes from an outer peripheral surface 5a on an intermediate part of the inner tube 5 between a pushing-in end 5P1 at the pushing-in side P1 and a drawing-out end 5P2 at the drawing-out side P2 in a longitudinal direction of the inner tube 5, and an outer tube 8 having a larger diameter and contiguous with an outer peripheral surface of the annular coupling section 6.

The outer tube 8 is coaxial with the inner tube 5 and is disposed through a space on an intermediate part of the inner tube 5 in its longitudinal direction. The inner tube 5 protrudes from opposite ends of the outer tube 8 at the pushing-in side P1 and the drawing-out side P2 in the longitudinal direction.

The outer tube 8 extends to the drawing-out side P2 from a connecting part between the outer tube 8 and an outer peripheral surface of the annular coupling section 6. A larger thickness portion 9 formed on the connecting part is provided on an outer peripheral surface with an annular vehicle body latch recess 10. A slant wall section 11 is contiguous with the larger thickness portion 9 and extends to the drawing-out side P2 to reduce a diameter of the portion 11 in the axial direction. The slant wall section 11 is provided on its distal end with a drawing-out distal end side tubular portion 12 that extends in parallel to the axial direction of the inner tube 5.

An annular clearance S (FIG. 3) is defined between an inner peripheral surface of the drawing-out distal end side tubular portion 12 and the outer peripheral surface 5a of the inner tube 5 to separate the portion 12 apart from the inner tube 5. That is, a smaller diameter end of the outer tube 8 surrounds the outer peripheral surface of the inner tube 5 through the annular clearance S and the drawing-out side end 5P2 protrudes outward from the outer tube 8.

Figure 3:
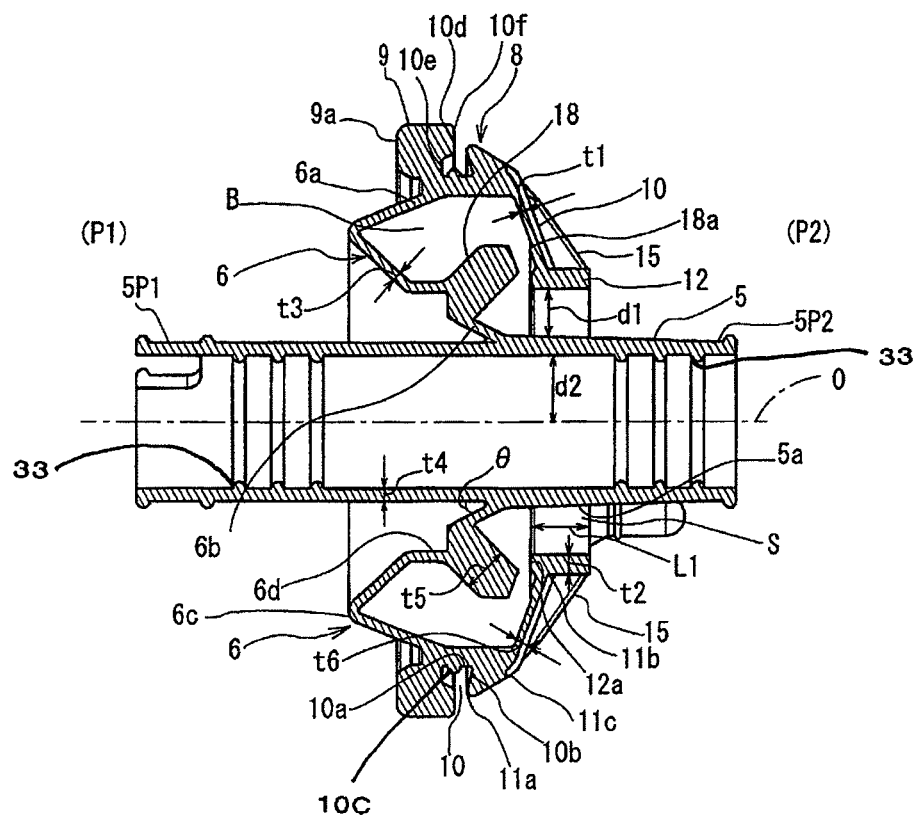
FIG. 3 is a longitudinal section view of the grommet taken along lines in FIG. 2.

As shown in FIGS. 3, a radial distance d1 of the annular clearance S is set to be ½ to ³⁄₂ (one-half to three-halves) of an inner radius d2 of the inner tube 5. It is preferable in the present embodiment that the radial distance d1 is ¾ (three quarters) of the inner radius d2. A length L1 of the drawing-out distal end side tubular portion 12 that extends through the annular clearance S in parallel to the outer peripheral surface 5a of the inner tube 5 may be altered in accordance with a size of the grommet 1. It is preferable in the present embodiment that the length L1 is 5 to 15 mm (five to fifteen millimeters).

Figure 4:
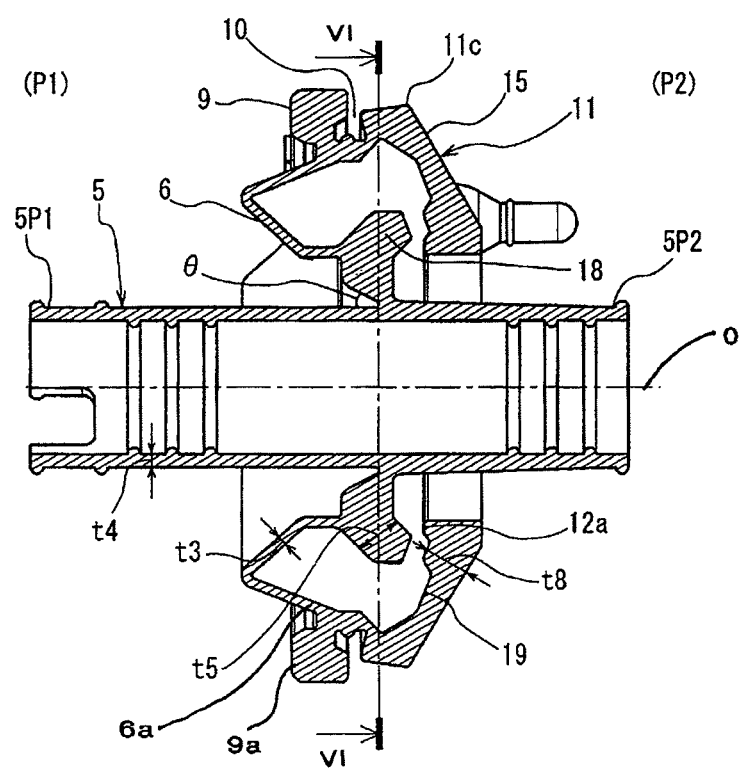
FIG. 4 is a longitudinal section view of the grommet taken along lines IV-IV in FIG. 2.

As shown in FIGS. 3 and 4, the larger thickness portion 9 of the outer tube 8 protrudes slightly toward the pushing-in side P1 from the connecting part between the larger thickness portion 9 and an outer peripheral end 6a of the annular coupling section 6. A pushing-in side distal end surface 9a defines an orthogonal surface to an axis O of the inner tube 5. An annular vehicle body latch recess 10 is provided on a boundary area between the larger thickness portion 9 and the slant wall section 11. A distal end of a drawing-out side surface 10b that stands up from a bottom surface 10a of the vehicle body latch recess 10 is contiguous with a larger diameter end 11a of the slant wall section 11. A smaller diameter end 11b of the slant wall section 11 is contiguous with the drawing-out distal end side tubular portion 12. A curved portion 11c is provided between the larger diameter end 11a of the slant wall 11 and the smaller diameter end 11b so as to change an inclination angle of the outer peripheral surface of the slant wall section 11.

An inclination angle at the smaller diameter end side with respect to the curved portion 11c is set to be large while an inclination angle at the larger diameter end side with respect to the curved portion 11c is set to be small.

The slant wall section 11 is provided on the outer peripheral surface that changes the inclination angle with axially stepped projecting ribs 15 that extend from the larger diameter end 11a of the distal end of the drawing-out side surface 10b on the vehicle body latch recess 10 to the smaller diameter end 11b and are spaced apart from one another in the peripheral direction. Since these projecting ribs 15 have the same widths in the peripheral direction, the projecting ribs 15 that extend radially from the smaller diameter end to the larger diameter end have narrow distances between the adjacent ribs 15 at the smaller diameter end side in the peripheral direction and wide distances between the adjacent ribs 15 at the larger diameter end side. An imaginary circle created by continuing the stepped projecting ribs 15 in the peripheral direction of the curved portion 11c is set to be equal to an inner diameter of the through-hole 3 in the vehicle body panel 2. In the present embodiment, the number of the stepped projecting ribs 15 is six (6) and the pitches of the ribs are sixty (60) degrees.

Figure 5:
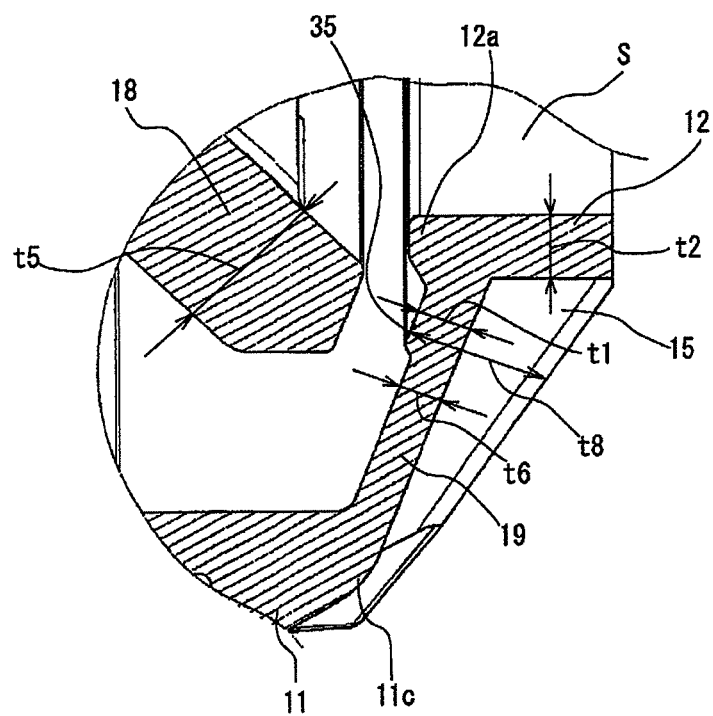
FIG. 5 is an enlarged section view of a main part of the grommet shown in FIG. 3.

As shown in FIG. 5, the slant wall section 11 is provided on its inner peripheral surface at the smaller diameter side over the curved portion 11c with an annular bending stress absorbing portion 19 that is a shallow recess and has a smaller thickness.

A thickness t6 of the bending stress absorbing portion 19 is set to be 50 to 80% (fifty to eighty percent) of a thickness t1 of the slant wall section 11 on which the projecting ribs 15 are not provided and to be 70 to 90% (seventy to ninety percent) of a thickness t8 of the slant wall section on which the projecting ribs 15 are provided.

As shown in FIG. 4, the bending stress absorbing portion 19, of which the inner surface is recessed, is provided on its outer peripheral surface with first parts that are provided with the projecting ribs 15 and second parts which are not provided with the projecting ribs 15.

A portion at the smaller diameter side adjacent the bending stress absorbing portion 19 defines a receiving portion 35 (FIG. 5) that contacts with a pushing rib 18 mentioned after. The receiving portion 35 is contiguous with the drawing-out distal end side tubular portion 12. An inner end of the drawing-out distal end side tubular portion 12 is provided with a stopper projection 12a (FIG. 5) so as to prevent the pushing rib 18 from slipping.

The projecting ribs 15 couple their smaller diameter side end surfaces 15b to the outer peripheral surface of the drawing-out distal end side tubular portion 12.

As shown in FIG. 1A, each projecting rib 15 is provided on its larger diameter end side at the distal end of the drawing-out side surface 10b of the vehicle body latch recess 10 with a slant surface 15c that inclines the top surface 15a of the projecting rib 15 downward to the drawing-out side surface 10b. Both side surfaces 15d and 15e of each projecting rib 15 at its distal end side across the slant surface 15c define slant surfaces 15f and 15g that approach to each other. That is, each projecting rib 15 is provided on its larger diameter end with the slant surfaces 15, 15f, and 15g that are cut at three sides. Thus, since the distal end surface of each projecting rib 15 is cut at the three sides to form round corners and to eliminate edges, the projecting ribs 15 are not caught by the peripheral edge around the through-hole 3 when the peripheral edge around the through-hole 3 in the vehicle body panel 2 drops down into the vehicle body latch recess 10.

An inner peripheral surface of the outer tube 8 is parallel to the axial direction O from a position corresponding to the vehicle body latch recess 10 to a position corresponding to the curved portion 11c of the slant wall section 11. A thickness of this part is relatively large. On the other hand, a thickness t1 (FIG. 3) of the outer tube 8 is set to be small from the curved portion 11c to the drawing-out distal end side tubular portion 12. A thickness t2 (FIG. 3) of the drawing-out distal end side tubular portion 12 is set to be larger than the thickness t1.

Figure 2:
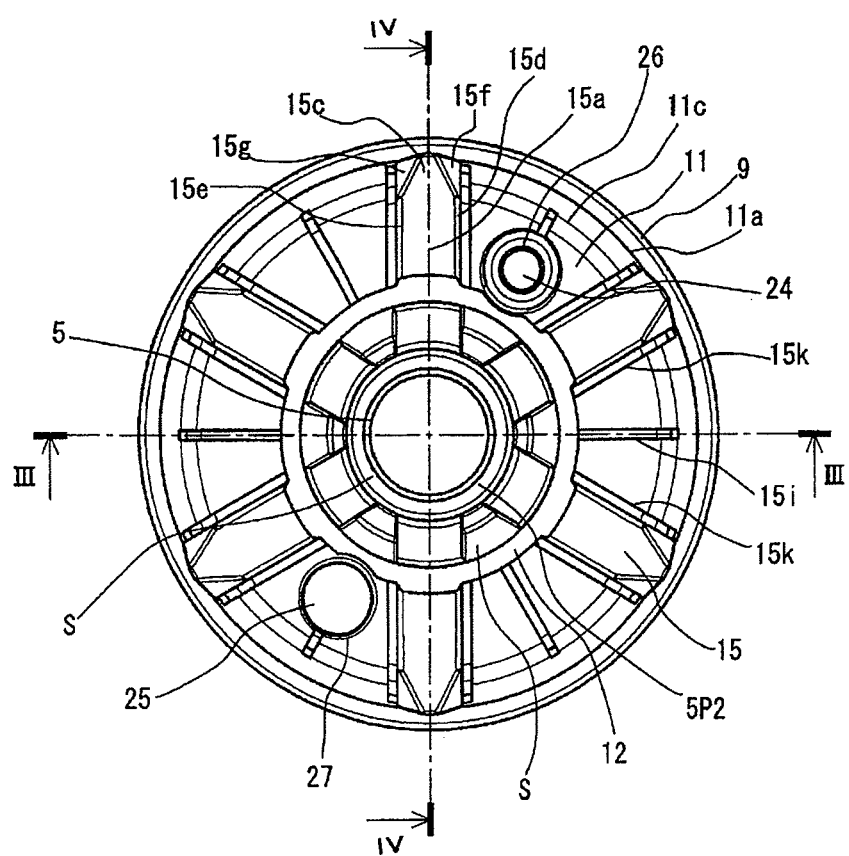
FIG. 2 is a plan view of the grommet shown in FIG. 1A, illustrating the grommet taken from the drawing-out side.
Figure 6:
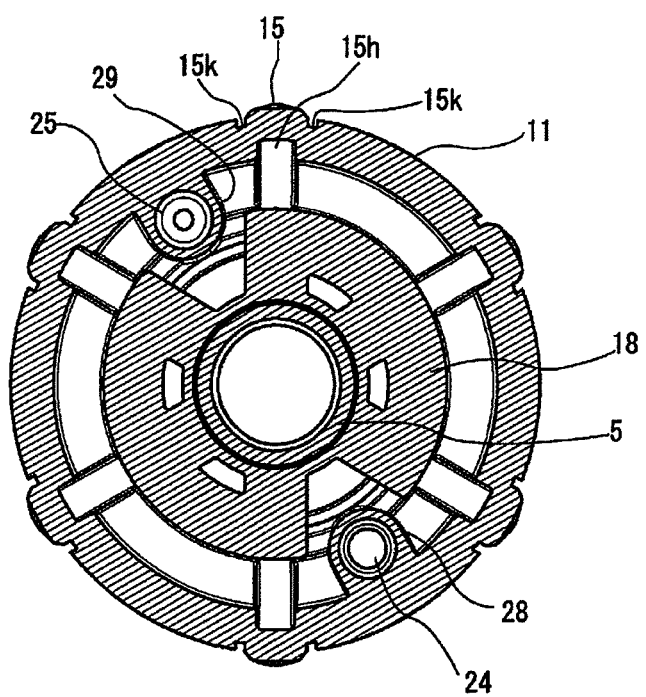
FIG. 6 is a cross section view of the grommet taken along lines VI-VI in FIG. 4.

Furthermore, as shown in FIG. 6, each projecting rib 15 of the slant wall section 11 is provided in its inner peripheral surface with a groove 15h to reduce stiffness of each projecting rib 15, thereby easily deflecting the projecting ribs 15 inward when the projecting ribs 15 are pressed onto the inner peripheral surface around the through-hole 3. Further, as shown in FIG. 2, the slant wall section 11 is provided with axial grooves 15k and 15i on its outer surface at proximal ends of each projecting rib 15 and on each central parts between the adjacent projecting ribs 15, respectively, thereby facilitating to deflect the slant wall section 11.

As shown in FIGS. 3 and 4, the annular coupling section 6 that interconnects the outer tube 8 and inner tube 5 protrudes in a V-shaped configuration from an inner peripheral end 6b contiguous with the outer peripheral surface 5a of the inner tube 5 to the pushing-in side P1. The outer peripheral end 6a of the annular coupling section 6 is disposed at the pushing-in side P1 over the inner peripheral end 6b and is contiguous with the larger thickness portion 9 of the outer tube 8.

That is, although the smaller diameter side of the enlarging diameter tubular section is contiguous with the smaller diameter tubular section in the prior art one-motion type grommet 100 shown in FIGS. 10A and 10B, the larger diameter side of the outer tube 8 (corresponding to the enlarging diameter tubular section) is coupled through the annular coupling section 6 to the inner tube 5 in the grommet 1 of the present invention.

A thickness t3 (FIG. 3) of the annular coupling section 6 is set to be substantially equal to or less than a thickness t4 (FIG. 3) of the inner tube 5 so as to be deflectable. An angle θ of the annular coupling section 6 that is slant coupled to the outer peripheral surface of the inner tube 5 is set to be 20 to 30 (twenty to thirty) degrees. Thus, the inner tube 5 and outer tube 8 are not interconnected to each other directly in the radial direction but interconnected to each other through the V-shaped annular coupling section 6. Thus, when the inner tube 5 is deformed in connection with bending of the wire harness W/H, the annular coupling section 6 absorbs the deformation of the inner tube 5, so that the deformation of the inner tube 5 is not transmitted directly to the outer tube 8. This serves as a release portion.

As shown in FIG. 3, the annular coupling section 6 is provided on its inclined portion between an inner peripheral end 6b and a V-shaped projecting end 6c with a bent portion 6d that is bent toward the slant wall section 11. A pushing rib 18 having a larger thickness protrudes from the bent portion 6d toward the slant wall section 11. As shown in FIG. 6, the pushing rib 18 is continuous in its peripheral direction but it is divided at positions corresponding to guide inner tubes 28 and 29 for permitting an opener cable and a feed water hose to pass.

A thickness t5 (FIG. 3) of the pushing rib 18 is large enough to be 2 to 4 (two to four) times of the thickness t3 of the annular coupling section 6, is larger than the thickness t1 of the slant wall section 11, and is substantially the same as the thickness of the larger thickness portion 9.

The reason why the pushing rib 18 is a larger thickness is ascribable to the fact that, when the grommet 1 is inserted into the through-hole 3 in the vehicle body panel 2, a projecting end 18a of the pushing rib 18 contacts with the inner peripheral surface of the slant wall section 11 to permit the pushing force to be transmitted to the outer tube 8. When the grommet 1 is attached to the vehicle body panel 2, the projecting end 18a of the pushing rib 18 is disposed near the slant wall section 11 so that they can contact with each other. Thus, a sound-insulating space B (FIG. 3) is defined among the pushing rib 18, the inner tube 5, the annular coupling section 6, and the outer tube 8.

As shown in FIGS. 3 and 4, the pushing rib 18 protrudes slightly slant in its outer diametrical direction. The projecting end 18a is opposed to the smaller diameter end of the slant wall section 11 contiguous with the drawing-out distal end side tubular portion 12. The drawing-out distal end side tubular portion 12 is provided with a stopper projection 12a, which protrudes inward from the slant wall section 11, at a side of the slant wall section 11 with which the pushing rib 18 contacts. Since the stopper projection 12a is provided on the drawing-out distal end side tubular portion 12, it is possible to prevent the projecting end 18a of the pushing rib 18 from slipping down into the drawing-out distal end side tubular portion 12 and to surely bring the pushing rib 18 into contact with the slant wall section 11 so as to transmit the pushing force to the slant wall section 11.

As shown in FIG. 2, the slant wall section 11 of the outer tube 8 is provided with through-apertures 24 and 25 for two wire members (mentioned above) including an opener cable for releasing a bonnet and a feed water hose for a washer. The wire members are inserted into the through-apertures 24 and 25 from the pushing-in side P1 to the drawing-out side P2 to be arranged from the engine room X to the passenger room Y.

The smaller diameter inner tube 5, through which the wire harness W/H passes, protrudes from the opposite ends of the outer tube 8 in the longitudinal direction. The inner tube 5 is provided on an inner peripheral surface of each protruding end portion over the outer tube 8 with three waterproofing lips 33 (FIG. 3).

As shown in FIG. 7, since the through-hole 3 in the vehicle body panel 2 for receiving the grommet 1 is an aperture with a burr 3b that protrudes from the peripheral edge 3a around the through-hole 3 to the pushing-in side P1, the vehicle body latch recess 10 in the outer tube 8 has a configuration corresponding to the burr 3b.

That is, as shown in FIGS. 3 and 7, the vehicle body latch recess 10 is provided on a central part of its bottom surface 10a with a seal lip 10c to contact with the burr 3b. A drawing-out side surface 10b of the vehicle body latch recess 10 at the side of the slant wall section 11 inclines a distal end of the surface 10b inward. In addition, a side surface 10d opposed to the side surface 10b is provided with a depression 10e contiguous with the bottom surface 10a to contain a distal end of the burr 3b. A vertical surface 10f stands up from the depression 10e so that an upper end of the vertical surface 10f extends upward over the drawing-out side surface 10b.

A process for attaching the wire harness W/H to the grommet 1 is carried out by inserting the electrical cables in the wire harness W/H while enlarging the inner peripheral surface of the inner tube 5 by a jig (not shown). After inserting the wire harness W/H into the inner tube 5, the wire harness W/H drawn out from the opposite ends 5P1 and 5P2 of the inner tube 5 and the opposite ends 5P1 and 5P2 are secured to one another by winding adhesive tapes 40 around them.

Varying sizes in diameter of the wire harness W/H are absorbed in the annular coupling section 6, so that the outer tube 8 connected through the annular coupling section 6 to the inner tube 5 is not subject to effects caused by the varying sizes. Accordingly, it is possible to maintain the outer diameter of the outer tube 8 in a designed size. That is, since the annular coupling section 6 has a smaller thickness enough to be deformed and is formed into the V-shape, the annular coupling section 6 can respond to the varying sizes in diameter merely by changing the bending angle.

As shown in FIG. 7, the grommet 1 mounted on the wire harness W/H is inserted into and attached to the through-hole 3 with the burr 3b in the vehicle body panel 2 that partitions a vehicle body into the engine room X and the passenger room Y.

A working of inserting the grommet 1 into the through-hole 3 is carried out by inserting the drawing-out end 5P2 of the inner tube 5 into the through-hole 3 from the engine room X, and then pushing the grommet 1 into the through-hole 3 by a working person in the engine room X while holding the wire harness W/H with the grommet 1 by the working person. The grommet 1 is latched in the through-hole 3 by an one-motion operation in which a pushing-in action is effected at one time from the one side.

Specifically, since the smaller diameter side of the slant wall section 11 of the outer tube 8 is smaller than the inner diameter of the through-hole 3, the grommet 1 can be readily inserted into the through-hole 3. When the curved portion 11c of the slant wall section 11 reaches the inner peripheral surface 3a of the through-hole 3, the projecting ribs 15 of the slant wall section 11 contact with the inner peripheral surface 3a, thereby causing an inserting resistance. Then, the outer tube 8 cannot be further pushed into the through-hole 3 easily from the inner peripheral surface 3a.

However, if the working person holds and pushes the wire harness W/H to be drawn out from the pushing-in side P1 of the inner tube 5, the inner tube 5 that closely contacts with the wire harness W/H is advanced to the drawing-out side P2 in the drawing-out direction. The pushing rib 18 of the annular coupling section 6 connected to the inner tube 5 is also advanced to the inner surface of the slant wall section 11 of the outer tube 8 by the movement of the inner tube 5 and the projecting end 18a of the pushing rib 18 bumps onto the inner peripheral surface of the slant wall section 11. Thus, since the slant wall section 11 is pushed and moved forward by the pushing rib 18, the outer tube 8 with the slant wall section 11 passes through the through-hole 3 to the passenger room Y.

When the pushing rib 18 pushes the slant wall section 11, since the slant wall section 11 is provided on the outer peripheral surface with the projecting ribs 15 although the slant wall section 11 is provided on the recessed inner peripheral wall with the bending stress absorbing portion 19, it is possible to transmit the pushing force of the pushing rib 18 to the slant wall section 11. Also, the stopper projection 12a can prevent the projecting end 18a of the pushing rib 18 from sliding down into the drawing-out distal end side tubular portion 12. Thus, it is possible to surely hold the projecting end 18a of the pushing rib 18 on the inner peripheral surface of the slant wall section 11 and to transmit the pushing force from the pushing rib 18 to the slant wall section 11.

Since the slant wall section 11 is provided on the outer peripheral surface with the projecting ribs 15, only the top surfaces 15a of the projecting ribs 15 contact with the inner peripheral surface 3a of the through-hole 3 and the inner peripheral surface of the burr 3b, when the pushing rib 18 is inserted into the through-hole 3. Consequently, a contact area is reduced and an inserting force is lowered. Each projecting rib 15 is provided in the inner peripheral surface with a groove 15h to facilitate causing the projecting rib 15 to be deflected. The smaller thickness portion between the adjacent projecting ribs 15 can be easily deflected by the grooves 15k provided on both proximal ends of each projecting rib 15 and the central groove 15i in the smaller thickness portion. The slant wall section 11 of the outer tube 8 can be pushed into the through-hole 3 by pressing the pushing rib 18 onto the inner peripheral surface of the slant wall section 11 and the pushing force can be reduced.

The pushing rib 18 presses the slant wall section 11 and the distal ends of the projecting ribs 15 reach the inner peripheral surface 3a of the through-hole 3. Since each projecting rib 15 is provided on the distal end with slant surfaces 15c, 15f, and 15g in three cut-away sides, the inner peripheral surface 3a of the through-hole 3 and the burr 3b fall down into the vehicle body latch recess 10 as if the projecting ribs 15 fall down into the through-hole 3, and the grommet 1 can be secured to the vehicle body panel 2.

Figure 8:
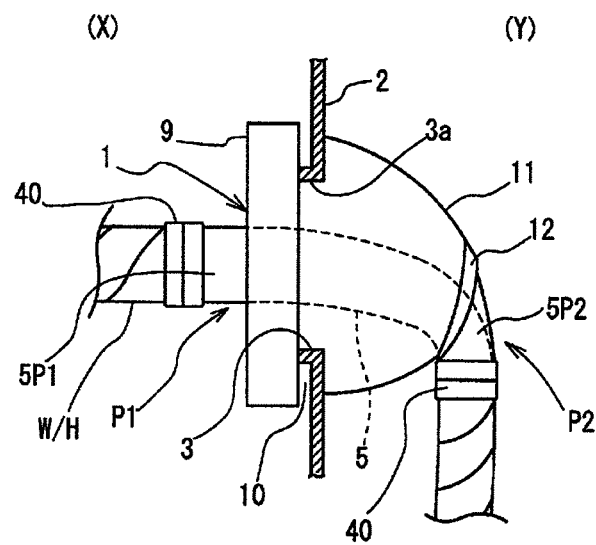
FIG. 8 is a side elevation view of the grommet in the case where the wire harness is bent at the drawing-out side of the grommet.
Figure 11A:
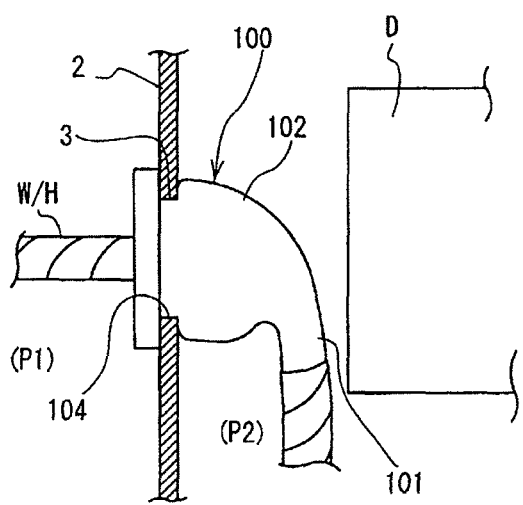
FIGS. 11A and 11B are explanatory views illustrating problems in the prior art grommet.
Figure 11B:
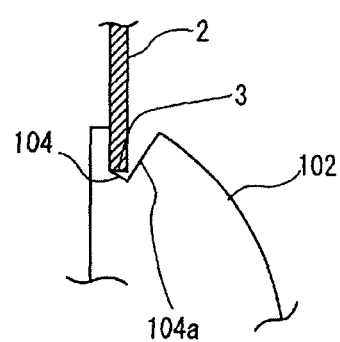

As described above, after the grommet 1 is secured to the vehicle body panel 2, as shown in FIG. 8, the wire harness W/H drawn out into the passenger room Y is sharply bent downward (or upward, rightward, or leftward) by an angle of 90 (ninety) degrees, in many cases.

In the case where the wire harness W/H is bent downward by the angle of 90 degrees, the conventional grommet is pulled down at its upper part and the vehicle body latch recess floats up at the distal end side, so that a sealing function is hard to obtain.

On the contrary, since the grommet 1 of the present invention is constructed as described above, it is possible to prevent the vehicle body latch recess 10 from floating up and to obtain a good sealing function.

That is, the wire harness W/H can closely contact with and pass through the inner tube 5, the inner tube 5 secured to the wire harness W/H by the adhesive tapes 40 follows the bending angle of the wire harness W/H, and the inner tube 5 is bent downward at the drawing-out end 5P2. However, even if the drawing-out end 5P2 is bent downward, the outer tube 8 is not coupled to the inner tube 5 at the drawing-out end 5P2 and the great clearance S exists between the drawing-out distal end side tube 12 of the outer tube 8 and the inner tube 5. Thus, since the inner tube 5 is merely bent in the clearance S between the inner tube 5 and the outer tube 8, the outer tube 8 is not bent at the drawing-out side P2.

Even if the inner tube 5 is bent greatly on account of the bending of the wire harness W/H and the inner tube 5 contacts with the drawing-out distal end side tube 12 to deform it, since the bending stress absorbing portion 19 is provided at the smaller diameter side of the slant wall section 11, a stress upon deformation is concentrated in the bending stress absorbing portion 19. Thus, the bending stress absorbing portion 19 is merely partially bent, so that the vehicle body latch recess 19 is not deformed at the larger diameter end side of the slant wall section 11.

The bending of the inner tube 5 is transmitted through the annular coupling section 6 to the outer tube 8. However, even in this case, the V-shaped thin annular coupling section 6 can absorb the deformation, so that the outer tube 8 is not deformed on account of the bending of the wire harness W/H. Accordingly, the vehicle body latch recess 10 in the outer tube 8 is not deformed so that the recess 10 floats up from the inner peripheral surface 3a of the through-hole 3 or the inner peripheral surface of the burr 3b, thereby obtaining a good sealing function.

Thus, even if the wire harness W/H drawn out from the grommet 1 is bent perpendicularly, since the bending stress absorbing portion 19 is provided at the smaller diameter side of the slant wall section 11, it is possible not to transmit the deformation of the wire harness W/H to the vehicle body latch recess 10 provided on the larger diameter side of the slant wall section 11. Also, since the inner tube 5 and outer tube 8 are spaced through the great clearance S apart from each other and the inner tube 5 is coupled to the outer tube 8 through the V-shaped thin annular coupling section 6 from the intermediate part of the inner tube 5, the deformation effect of the inner tube 5 is not applied to the vehicle body latch recess 10 of the outer tube 8.

FIG. 9 shows a second embodiment of a grommet 1-1 in accordance with the present invention.

The grommet 1-1 includes a smaller diameter tubular section 50 corresponding to the inner tube 5 in the first embodiment, an enlarging diameter tube 51 corresponding to the outer tube 8 in the first embodiment, a slant wall section 52 connected to the tube 51, and a thin bent annular coupling portion 53 that couples the smaller diameter tubular section 50 to a smaller diameter end of the slant wall section 52.

The slant wall section 52 is provided with a curved portion 52c and stepped projecting ribs 15 that extend from a smaller diameter end to a larger diameter end of the section 52 and that are disposed radially on the section 52, as is the case with the first embodiment.

A recessed thin bending stress absorbing portion 19 is provided on an inner peripheral surface between the curved surface 52c of the slant wall section 52 and the smaller diameter end of the section 52 in an annular manner.

The slant wall section 52 is provided on a larger diameter end with a larger thickness portion 56 and on an outer peripheral surface with a vehicle body latch recess 10 in an annular manner. A thin closing surface portion 55 protrudes from an inner peripheral surface of the enlarging diameter tubular section 51 opposed to a bottom surface side of the vehicle body latch recess 10. The closing surface portion 55 is divided on a central part in a diametrical direction to define a wire harness passing portion.

Even if the wire harness is bent in the grommet 1-1 constructed as described above and the smaller diameter tubular section 50 is also bent, since the bending stress absorbing portion 19 is provided on the smaller diameter side inner surface of the slant wall section 52 through the thin annular coupling portion 53 of the smaller diameter tubular section 50, the bending stress absorbing portion 19 is partially bent, thereby absorbing the bending and preventing the bending from transmitting to the vehicle body latch recess 10.

Also the thin deflectable annular coupling portion 53 can absorb a bending load.

The invention claimed is:

1. A grommet configured for mounting on a wire harness to be inserted into a through-hole in a vehicle body panel, and engaged with said vehicle body panel, said grommet being made of an elastic material and comprising:

an inner tube through which electrical cables in said wire harness pass in a close contact manner;

an annular coupling section protruding from an outer peripheral surface of said inner tube at an intermediate part between both ends of said inner tube at a first side of said vehicle body panel and a second side of said vehicle body panel in a longitudinal direction; and an outer tube coupled through said annular coupling section to said inner tube and provided with a slant wall section;

wherein said slant wall section of said outer tube is provided with a curved portion at a position having an outer diameter equal to an inner diameter of said through-hole, said curved portion has a different inclination angle from said slant wall section, an inclination angle of said slant wall section at a larger diameter side with respect to said curved portion is set to be smaller than an inclination angle at a smaller diameter side with respect to said curved portion, a larger thickness portion of said outer tube is contiguous with a larger diameter end of said slant wall section in parallel to an axial direction, and a vehicle body latch recess is provided in an outer peripheral surface of said slant wall section between said larger diameter end of said slant wall section and said larger thickness portion in an annular manner;

wherein said slant wall section is provided with a plurality of stepped projecting ribs that extend from a smaller diameter end of said slant wall section to said larger diameter end and are spaced apart from one another in a peripheral direction, and said slant wall section is provided on an inner peripheral surface at said smaller diameter side with a bending, stress absorbing portion of which an inner surface is recessed annularly be a smaller thickness;

wherein said larger thickness portion of said outer tube is contiguous with an outer end of said annular coupling section, an inner peripheral surface at said smaller diameter end side of said slant wall section is spaced apart through a given clearance from said outer peripheral surface of said inner tube, and an end of said inner tube at said second side of said vehicle body panel protrudes outward from said slant wall section; and wherein said annular coupling section projects slantingly from a coupling part with said inner tube toward said first side of the vehicle body panel, a pushing rib protrudes from a slant portion of said annular coupling section toward an inner surface of said slant wall section of said outer tube, and said bending stress absorbing portion is disposed at a side of said curved portion over a position on said slant wall section with which said pushing rib contacts.

2. The grommet according to claim 1, wherein a thickness of said bending stress absorbing portion is 50 to 80% (fifty to eighty percent) of said slant wall section of which a portion is not provided with said projecting ribs, and is 70 to 90% (seventy to ninety percent) of said slant wall section of which a portion is provided with said projecting ribs.

* * * * *